S. H. AND J. W. C. BULLARD.
MULTICUTTING BAR.
APPLICATION FILED AUG. 6, 1918.

1,410,451.

Patented Mar. 21, 1922.

Inventor
Stanley H. Bullard and
Joseph W. C. Bullard
By Chamberlain & Newman
Attorneys

UNITED STATES PATENT OFFICE.

STANLEY H. BULLARD AND JOSEPH W. C. BULLARD, OF BRIDGEPORT, CONNECTICUT, ASSIGNORS TO THE BULLARD MACHINE TOOL COMPANY, OF BRIDGEPORT, CONNECTICUT, A CORPORATION OF CONNECTICUT.

MULTICUTTING BAR.

1,410,451.      Specification of Letters Patent.      Patented Mar. 21, 1922.

Application filed August 6, 1918. Serial No. 248,656.

*To all whom it may concern:*

Be it known that we, STANLEY H. BULLARD and JOSEPH W. C. BULLARD, citizens of the United States, and residents of Bridgeport, in the county of Fairfield and State of Connecticut, have invented certain new and useful Improvements in Multicutting Bars, of which the following is a specification.

This invention relates to new and useful improvements in cutting bar for use in machine tools and has for its object to produce a durable and convenient bar that is adapted to accommodate different sizes and kinds of cutters whereby several distinct cuts may be produced without removing or resetting the bar; to form the bar so that both floating and fixed cutters may be supported and whereby the fixed cutter may be adjusted to required positions, and finally to so construct the bar that the several cutters may be located near the lower end and whereby round, true and straight holes may be produced.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Fig. 1 shows a side elevation of our improved boring and cutting bar, with a cutter mounted therein;

Figure 1:
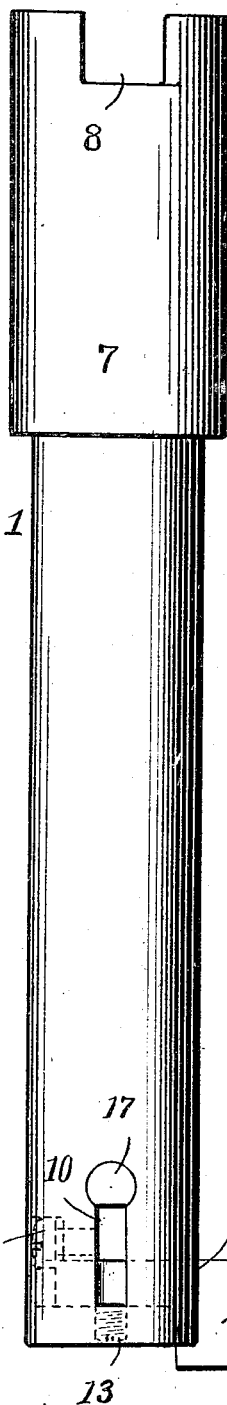
Figure 2:
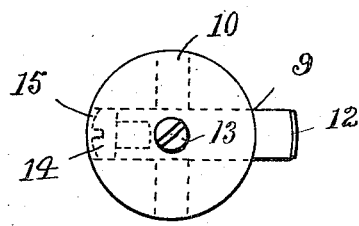
Fig. 2 is a bottom end view of Fig. 1.
Figure 3:
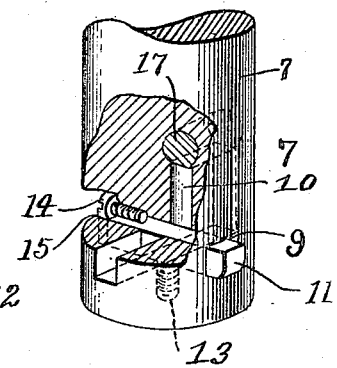
Fig. 3 shows a broken sectional perspective view of the lower portion of the bar, illustrating the relation of the cutter holes and position of cutter and adjusting screw.

Referring in detail to the characters of reference marked upon the drawings, 7 indicates the bar as a whole and 8 a cross slot therein for its rigid support in a machine tool carrying head. The cutters are supported in the lower end portion of the bar and for this purpose cross slots or sockets 9 and 10 are formed therethrough in a manner to allow the cutters to be positioned near the lower end of the bar. The smaller slot 9 is adapted to receive the roughing cutter 11 as shown in Fig. 3, or alternately, the threading cutter 12 as seen in Figs. 1 and 2.

A set screw 13 is mounted in the center of the lower end of the bar and serves to secure these cutters in position after they have been positioned. The back ends of these cutters 11 and 12 are seated against the under side of the head of an adjustable screw 14 that is positioned in a pocket 15 of the bar so that the screw is wholly within the periphery of the bar and arranged parallel with the cutter. This adjustable screw thus serves to adjust the cutter to exact position preparatory to being secured by the set screw 13.

The slot 10 is considerably larger or broader than the slot 9 for the roughing cutters and is also adapted to accommodate a wider and longer cutter of any desired character having two cutting faces on its opposite ends. This is what we term a finishing cutter and is intended for use after the usual roughing cuts are made. An opening 16 is formed in the bar to receive a gib 17 to engage the top edge of the wider and longer cutter while the central portion of the bottom edge of the cutter is engaged and supported on the screw 13 located in the center of the lower end portion of the bar. This being a double end cutter and supported upon the under side and midway of its end portions by the single screw, it is free to float in the bar and therefore cannot "cut large".

As designed the bar can operatively carry but one cutter at a time. This may be either a roughing or a double end finishing cutter and while supported in different slots, yet are carried upon the same level in the slots which are at right angles to each other and intersect in the center of the bar.

Having thus described our invention what we claim and desire to secure by Letters Patent is,

1. A cutting bar having intersecting slots through the lower portion thereof, the lower extremities of said slots lying in a common plane, a pocket adjacent one of the slots, a cutter in the slot and means mounted in the pocket and engaging the adjacent end of the cutter whereby the cutter may be moved laterally of the bar to adjust same, and means mounted in the end of the bar to lock the cutter after adjustment.

2. A cutter bar having intersecting slots through the lower portion thereof, the lower extremities of said slots lying in a common plane and said slots adapted to at different times receive cutters, a pocket adjacent one of the slots, means mounted in the pocket to engage a cutter to adjust the same, a gib situated at the upper end of the other slot to be engaged by a different cutter, and means mounted in the end of the bar for locking either cutter in any position to which adjusted.

Signed at Bridgeport in the county of Fairfield and State of Connecticut this 5th day of Aug. A. D., 1918.

STANLEY H. BULLARD.
JOSEPH W. C. BULLARD.

Witnesses:
H. L. OVIATT,
SAMUEL W. DAVIS.